United States Patent
Sarkissian et al.

(10) Patent No.: US 9,823,155 B2
(45) Date of Patent: Nov. 21, 2017

(54) TEST PLUG FOR A PIPE ELBOW

(71) Applicant: EST Group, Inc., Hatfield, PA (US)

(72) Inventors: Ka'ren Sarkissian, Langhorne, PA (US); Alex Kotlyar, Warwick, PA (US); Danko Kobziar, Lansdale, PA (US)

(73) Assignee: EST Group, Inc., Hatfield, PA (US)

( * ) Notice: Subject to any disclaimer, the term of this patent is extended or adjusted under 35 U.S.C. 154(b) by 106 days.

(21) Appl. No.: 14/827,363

(22) Filed: Aug. 17, 2015

(65) Prior Publication Data

US 2017/0052086 A1 Feb. 23, 2017

(51) Int. Cl.
*G01M 3/02* (2006.01)
*F16L 55/136* (2006.01)
*F16L 55/11* (2006.01)
*F16L 43/00* (2006.01)

(52) U.S. Cl.
CPC ......... *G01M 3/022* (2013.01); *F16L 55/1108* (2013.01); *F16L 55/136* (2013.01); *F16L 43/00* (2013.01); *F16L 2201/30* (2013.01)

(58) Field of Classification Search
CPC .. G01M 3/022; G01M 3/2853; G01M 3/2861; G01M 3/2884; F16L 55/1108; F16L 55/1152; F16L 55/1157; F16L 55/12; F16L 55/124; F16L 55/128; F16L 55/13; F16L 55/132; F16L 55/136
See application file for complete search history.

(56) References Cited

U.S. PATENT DOCUMENTS

| | | | |
|---|---|---|---|
| 4,077,250 A | 3/1978 | Wesch | |
| 4,381,800 A * | 5/1983 | Leslie | F16L 55/136 138/90 |
| 4,390,043 A | 6/1983 | Ward | |
| 4,817,671 A | 4/1989 | Mathison et al. | |
| 5,676,174 A | 10/1997 | Berneski, Jr. et al. | |
| 5,797,431 A | 8/1998 | Adams | |
| 6,467,336 B1 | 10/2002 | Gotowik | |
| 6,601,437 B2 | 8/2003 | Gotowik | |
| 2003/0167827 A1 | 9/2003 | Berneski, Jr. et al. | |
| 2010/0051130 A1 | 3/2010 | Syse et al. | |
| 2010/0083738 A1 | 4/2010 | Padden | |
| 2011/0278022 A1* | 11/2011 | Holstad | F16L 55/136 166/386 |

(Continued)

FOREIGN PATENT DOCUMENTS

EP 2738439 A1 6/2014

OTHER PUBLICATIONS

International Search Report and Written Opinion of the ISA issued in International PCT Application No. PCT/US2016/047407 dated Oct. 31, 2016.

*Primary Examiner* — Natalie Huls
(74) *Attorney, Agent, or Firm* — Howson & Howson LLP

(57) ABSTRACT

A test plug for insertion into and plugging of an open end of an elbow pipe is provided. The test plug includes a resilient sealing element and set of gripper segments carried on a shaft. The set of gripper segments are movable relative to the shaft between pipe-gripping and pipe-non-gripping positions such that, when the test plug is placed in sealing and gripping engagement relative to an inner diameter wall of an elbow pipe, the set of gripper segments are positioned in eccentric relation to at least one of the sealing element and the shaft.

15 Claims, 21 Drawing Sheets

(56) References Cited

U.S. PATENT DOCUMENTS

2012/0038150 A1* 2/2012 Williams ............... F16L 19/10
  285/342
2015/0369689 A1* 12/2015 Kotlyar ................ G01M 3/022
  73/49.8

* cited by examiner

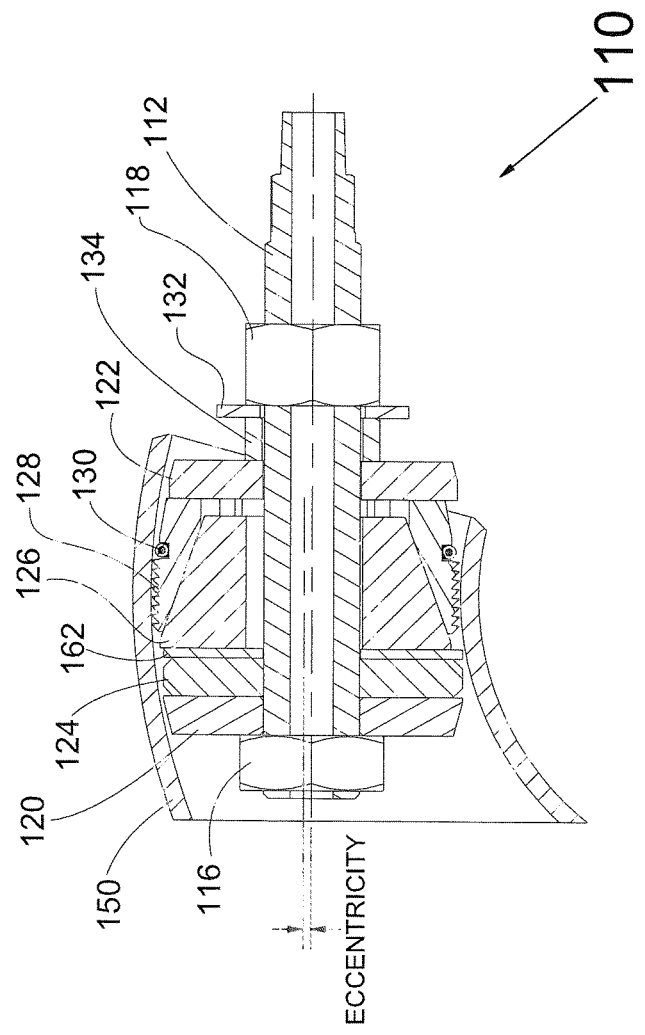

TEST PLUG FOR A PIPE ELBOW

BACKGROUND

The present invention relates to plugs for gripping and forming fluid-tight seals within inner peripheries of pipes, pipelines, tubes, pressure vessels and the like adjacent open ends thereof. More specifically, the present invention relates to test plugs that are able to reliably and safely form seals in pipe elbows for use in hydrotesting open end pipe elbows. The same test plug may also be capable of use in other tests and with other pipe configurations and fittings.

The plugs, for instance, may include hydrostatic test plugs, vacuum test plugs or the like for use in pressure testing pipes, pipelines, tubes, pressure vessels, pressure retaining components, and the like. The test plugs are used when performing leak tests or to verify structural integrity or strength of pipes, pipelines, tubes, pressure vessels, flange-to-pipe connections, pipe-to-pipe connections, and the like. Depending upon the material, size and thickness of the pipe and the pressure rating of the pipe, a test plug used to form a seal adjacent an open end of a pipe must be able to withstand at least the pressure rating of the pipe and must be able to resist movement, sliding, failure, blow-out and/or leakage during working pressures and must not damage the pipe.

Pipe system fabrication shops that assemble piping for customers, for instance, in the oil, gas, and chemical processing industries, have typically found it challenging to test, for instance, hydro-test, piping having an end that terminates with an open elbow joint. This is because an uncompromised tight seal is essential for accurate testing and safety, and elbow joints have inner wall geometries that make it difficult to obtain an uncompromised tight seal. Conventional and standard test plugs typically do not properly fit into an elbow pipe and are unable to form the required seal and grip.

A conventional solution to the above referenced problem has been to weld a separate piece of straight pipe to an elbow joint solely to enable testing so that a standard test plug may be installed for testing. After the test has been completed, the extra piece of straight pipe is removed and the elbow must be properly dressed to comply with engineering specifications. Thus, significant time and effort is necessary for temporarily adding and then removing such straight pieces of pipe.

BRIEF DESCRIPTION OF THE DRAWINGS

The foregoing and other objects, features and advantages of the embodiments disclosed herein should become apparent from the following description when taken in conjunction with the accompanying drawings.

FIG. 10 is a cross-sectional view of the test plug of FIG. 7 positioned within an elbow pipe.

FIG. 11 is a transverse cross-sectional view of the test plug and elbow pipe of FIG. 10.

DETAILED DESCRIPTION

Figure 1:
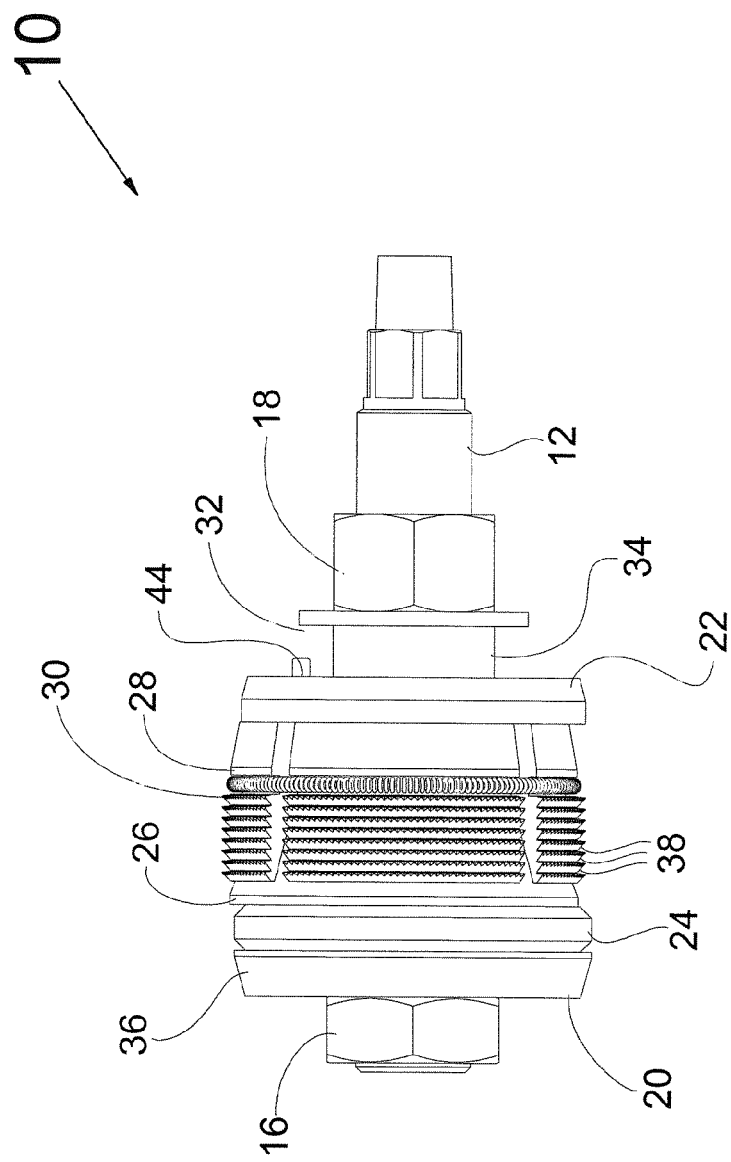
FIG. 1 is an elevational view of a first embodiment of a test plug.

Embodiments of test plugs disclosed herein may be used to temporarily create a fluid-tight seal within and relative to the inner diameter surface of a pipe during a hydro-test, pressure test, or other procedure of a pipe or section thereof. In particular, the test plugs provide elbow testing capabilities and may be used to test pipe elbows made from various metallic and polymer materials; such as: carbon steel, alloy steel, stainless steel, high alloys, GRE, PVC, FRP, and the like.

After the test plug is properly installed within an elbow pipe adjacent an open end of the elbow pipe, the elbow pipe or pipe section downstream of the plug may be pressurized with a fluid to a pressure sufficient to test for leaks or for any other purpose. Thus, the test plug must be able to create a seal relative to the inner surface geometry of an elbow pipe such that the seal is able to withstand internal pipe working pressures and remain in a fixed, non-sliding, stationary position within the pipe during testing. Thus, an installed test plug must resist sliding, movement, blow-out or failure during a testing procedure. In addition, for installation purposes, the test plug must be sufficiently compact that it can be readily inserted into and through the open end of the elbow pipe and must also be able to assume this position upon removal after testing is complete.

Various embodiments of elbow test plugs in accordance with the present invention are discussed below. For example, FIGS. 1-6 disclose a first embodiment, FIGS. 7-15 disclose a second embodiment, and FIGS. 16-24 disclose a third embodiment. These embodiments are disclosed merely by way of example and not by way of limitation.

Each of the embodiments permits a test plug to successfully provide a strong and reliable grip and leak-tight sealing within pipes having relatively complicated inner diameter surface geometries, such as provided by elbow-shaped or curved sections of pipes. In addition, at least some of the embodiments are also capable of being applied in straight sections of pipe thereby allowing the same test plug to accommodate different inner surface geometries such as those provided by curved sections of pipes and those provided by straight pipe sections.

The three illustrated embodiments have some similarities in assembly, components, and usage. For instance, each of the test plugs includes three main components: a seal, a set of grippers, and a shaft. The primary function of the seal is to provide a leak-tight barrier during a testing procedure, the primary function of the grippers is to retain the plug inside of the elbow test pipe, and the primary function of the shaft is to hold all parts of the plug together and to provide a path for providing a fluid, liquid or gas at supply pressure into or from the test area of the pipe.

One or more of the above referenced components (i.e., the seal, grippers and shaft) may be aligned eccentric in relation to the others of the above referenced components to enable the test plugs to function properly within a test pipe elbow (i.e., the grippers-to-shaft alignment may be eccentric, the grippers-to-seal alignment may be eccentric, and/or the seal-to-shaft alignment may be eccentric). For instance, the seal and grippers of the test plug may be eccentrically aligned to each other. In some embodiments, the seal and/or grippers may be configured to float or self-adjust relative to each other and/or the shaft to better conform to inner pipe elbow geometry. In other embodiments, the seal and/or grippers may be specifically positioned in the test plug in a fixed location that is eccentric to each other and/or the shaft in order to closely match the inner surface geometry of tested pipe elbow.

Accordingly, each test plug (referenced as 10, 110 and 210, respectively, in FIGS. 1-24) may include an elongate shaft (12, 112 and 212, respectively) that extends the length of the test plug and that may include a central bore (14, 114 and 214, respectively) which provides a path for the flow of a fluid under elevated or reduced pressure between testing equipment located outside of the pipe and a downstream location within the testing area of the pipe beyond the test plug. Each of the illustrated shafts (12, 112 and 212, respectively) may have a section with an outer periphery of a predetermined diameter and may include a jam nut or other fixed end component (16, 116 and 216, respectively) and a front nut or other front end component (18, 118 and 218, respectively) that is movable in an axial direction along the shaft for purposes of compressing and/or releasing the assembly of components carried on the shaft between the end components. See FIGS. 1, 7 and 16. Of course, while threaded nuts are shown as end components on a generally threaded cylindrical part of the shaft, other components, shapes, and means to cause relative movement of the components on the shaft can be utilized.

The components carried on the shaft between the front and jam nuts may include, for instance, a rear generally annular washer or plate (20, 120 and 220, respectively), a front generally annular washer or plate (22, 122 and 222, respectively), a generally annular and resilient seal or sealing element (24, 124 and 224, respectively), a camming element (26, 126 and 226, respectively), and a set of circumferentially-spaced grippers (28, 128 and 228, respectively). For example, see FIGS. 2, 8, 9, 17 and 18. Other components, for instance, may include a resilient garter or retaining spring, O-ring, or the like (30, 130 and 230, respectively) for retaining the set of grippers on the camming element of the test plug and a hardened washer (32, 132 and 232, respectively) and compression tube or the like (34, 134 and 234, respectively) which may extend between the front end nut and the front plate to space these components apart permitting the front end nut to be located in a readily addressable position adjacent an open end of a test elbow pipe. For instance, see FIGS. 3, 10 and 19.

Each of the rear and front plates (20 & 22, 120 & 122, and 220 & 222, respectively) has an opening extending therethrough such that the plates are able to slide lengthwise along the shaft (12, 112 and 212, respectively). The diameter of the openings of the plates may closely match the outer diameter of the section of the shaft on which the plates are carried and slid so that the plates may slide along an axial direction of the shaft with very little or no other motion or play therebetween. Thus, the front and rear annular plates may be retained in a substantially radial direction of the shaft. In addition, each of the rear plates (20, 120 and 220, respectively) has a tapered side outer side edge surface (36, 136 and 236, respectively) that tapers from a maximum outer diameter to a minimum outer diameter adjacent the jam nut (16, 116 and 216, respectively). The tapered edge (36, 136 and 236, respectively) permits the rear plate (20, 120 and 220, respectively) to accommodate concave surfaces of elbow pipes and the like. By way of example, see FIGS. 3, 10 and 19.

In use in any of the illustrated embodiments, as the front nut (18, 118 and 218, respectively) is advanced on the shaft (12, 112 and 212, respectively), the front and rear plates (20 & 22, 120 & 122, and 220 & 222, respectively) are brought closer together along the shaft causing the set of grippers (28, 128 and 228, respectively) to slide and advance up a sloping outer surface of the camming element (26, 126 and 226, respectively) and move radially toward an inner diameter surface of a pipe wall. After, the grippers initially contact the pipe wall and the test plug is then tightened further, the grippers bite into the pipe wall thereby resulting in the test plug assuming a stationary fixed position relative to the pipe. See any of FIGS. 6, 13, 15, 22 and 24.

Further tightening of the front nut (18, 118 and 218, respectively) causes the rear plate (20, 120 and 220, respectively) and jam nut (16, 116 and 216, respectively) to move toward the camming element within the pipe thereby compressing the sealing element (24, 124 and 224, respectively) which is located between the rear plate and camming element. Accordingly, the sealing element (24, 124 and 224, respectively), which may be made of a resilient material, such as an elastomeric material or the like, expands in a radial direction relative to the shaft and thereby ultimately forms a fluid-tight seal between the inner diameter surface of the pipe wall and the outer peripheral surface of the shaft on which the sealing element is carried. In this condition, the test plug firmly grips the pipe and a fluid-tight seal has been created. Loosening the front nut permits the resilient sealing element to return to its original uncompressed size and shape and releases the grippers from engagement with the pipe wall.

The camming elements (26, 126 and 226, respectively) discussed above may each have a generally frustoconical shape (i.e., having the shape of a truncated cone) and a lengthwise extending hollow channel extending therethrough into which the shaft (12, 112 and 212, respectively) is inserted. The outer camming surface of the camming element is in the shape of a truncated cone and therefore provides a sloping surface on which the grippers (28, 128 and 228, respectively) are carried and may be forced to advance up based on forces exerted by relative movement of the front and rear plates (20 & 22, 120 & 122, and 220 & 222, respectively) as discussed above. As the grippers slide upward on the sloped surface, they ultimately are advanced into a gripping position in engagement with the inner diameter surface of the pipe wall.

Each set of grippers (28, 128 and 228, respectively), for instance, may include four identical, separate, circumferentially-spaced gripper segments that extend about the sloped or cone-shaped outer surface of the camming element. For instance, see FIGS. 4, 11 and 20. More or less segments may be utilized; for example, the grippers may include six or more segments or only two or three segments.

Each of the gripper segments may have multiple circumferentially-spaced rows (38, 138 and 238, respectively) of teeth. By way of example, each segment may have eight uniform rows of teeth as shown in the illustrated embodiments. See FIGS. 1, 7 and 16. Of course, more or less rows may be provided. Each row extends circumferentially relative to the camming element and is longitudinally spaced from the other rows of teeth on the segment. Each row may be serrated so that each row on each segment comprises a series of pointed teeth with gaps therebetween. See FIGS. 1, 7 and 16. As an alternative, each row on each gripper segment may provide one elongate continuous tooth. The tips of all rows of teeth on each segment may be substantially aligned and may extend to the same outer diameter and each of the gripper segments may be of a uniform shape and size. For example, see the teeth of the grippers shown in FIGS. 15 and 24 which uniformly grip the cylindrical inner walls of a straight section of pipe.

While each of the illustrated embodiments may have various components in common, there are differences between the embodiments which are discussed below in detail separately for each embodiment.

First Embodiment

Test Plug Having a Fixed Eccentric Cone

In the first illustrated embodiment (see FIGS. 1-6), the hollow channel extending through the camming element 26 of the test plug 10 is offset from a central longitudinal axis C of the truncated cone-shaped camming element 26. For instance, see FIG. 3 which illustrates the central longitudinal axis C of the camming element 26 being offset by a distance B from a central longitudinal axis A of the open channel of the camming element 26. Since the open channel of the camming element 26 is offset, this creates a so-called fixed eccentric cone in which, for instance, the outer sloped surface of the camming element 26 is not centered about or equally spaced from the open channel and therefore the shaft 12 which extends therethrough. Thus, because the grippers 28 are supported on the outer sloped surface of the camming element 26, the grippers-to-shaft alignment is eccentric. Of course, the grippers-to-seal alignment will also be eccentric.

Figure 2:
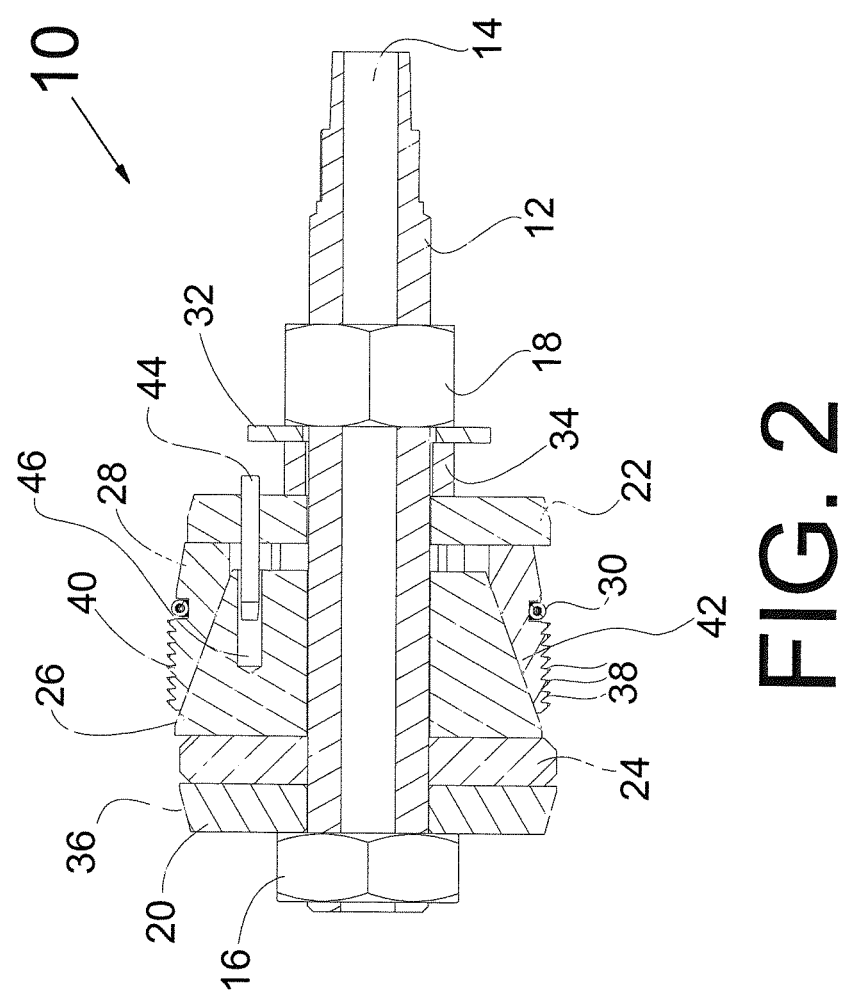
FIG. 2 is a cross-sectional view taken longitudinally of the test plug of FIG. 1.

For purposes of example, a first outer surface 40 of the camming element 26 shown in FIG. 2 is spaced further from the shaft 12 than an opposed second outer surface 42 of the camming element 26. This is due to the offset B of the central axis A of the hollow channel of the camming element 26 relative to the central axis C of the camming element 26. Solely for purposes of example, the offset B may be of a size that is 3% or greater of the diameter of the hollow channel or may be equal to 5% to 30% of the diameter of the hollow channel. Of course, any offset may be utilized.

As best shown in FIG. 2, the camming element 26 fits snuggly about the shaft 12 such that there is little or no gap or play therebetween. The camming element 26 may slide along the shaft 12, but there is otherwise little other motion permitted therebetween. The eccentric nature of the camming element 26 carried on the shaft 12 permits the test plug 10 to create better seals and grips on curved surfaces, for instance, provided by elbow pipes and the like. This is accomplished without having to alter or precisely match the outer peripheral shape of the gripper elements to accommodate curved pipe surfaces. All gripper segments of the test plug 10 may be uniform and identical. However, the grippers-to-shaft alignment will be eccentric.

Figure 3:
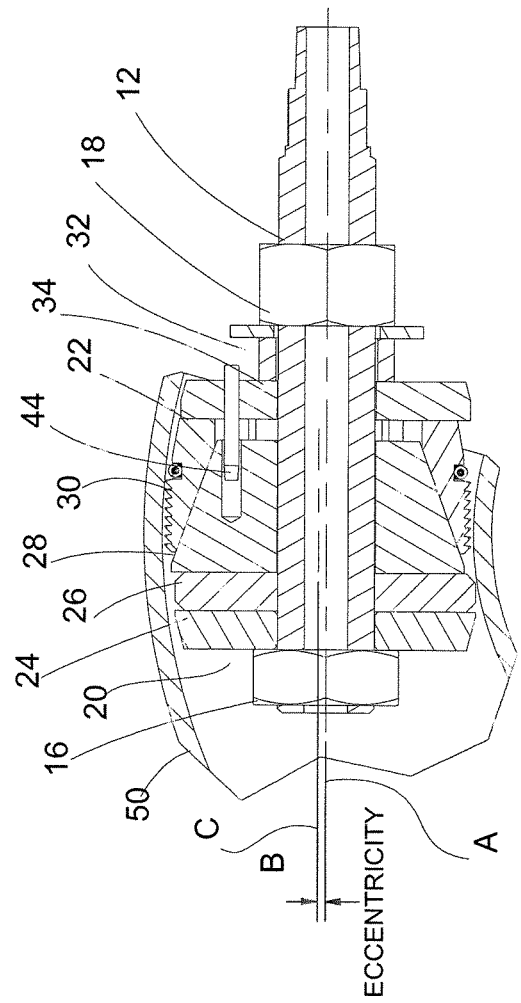
FIG. 3 is a cross-sectional view of the test plug of FIG. 1 positioned within an elbow pipe.
Figure 4:
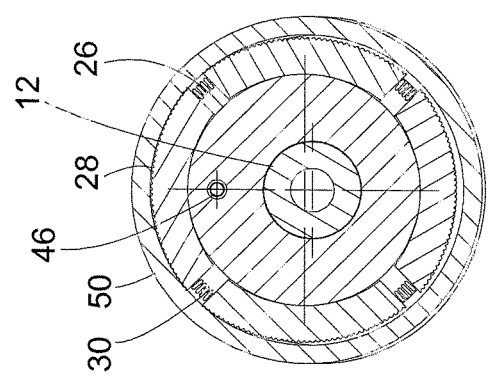
FIG. 4 is a transverse cross-sectional view of the test plug and elbow pipe of FIG. 3.

As best shown in FIGS. 2-4, the test plug 10 may include a dowel or guide pin 44 which prevents relative rotation between the front plate 22 and the camming element 26 but permits movement of the front plate 22 toward and away from the camming element 26. In the illustrated embodiment, the pin 44 is fixed to the front plate 22, and the camming element includes an aligned cavity 46 permitting entry and withdrawal of the pin 44 which thereby interconnects the front plate 22 and camming element 26 and prevents one from rotating about the shaft 12 without the other. Of course, the pin and cavity may be reversed such that the pin is carried by the camming element and the cavity is formed in the front plate. Also, other mechanisms for preventing relative rotation between these components may be utilized. In addition, the pin 44 may be located such that it visually identifies the part of the eccentric cone of the camming element 26 that extends a maximum distance from the shaft 12. For instance, see FIG. 3 and note the location of the pin 44 relative to the direction of offset B.

Figure 5:
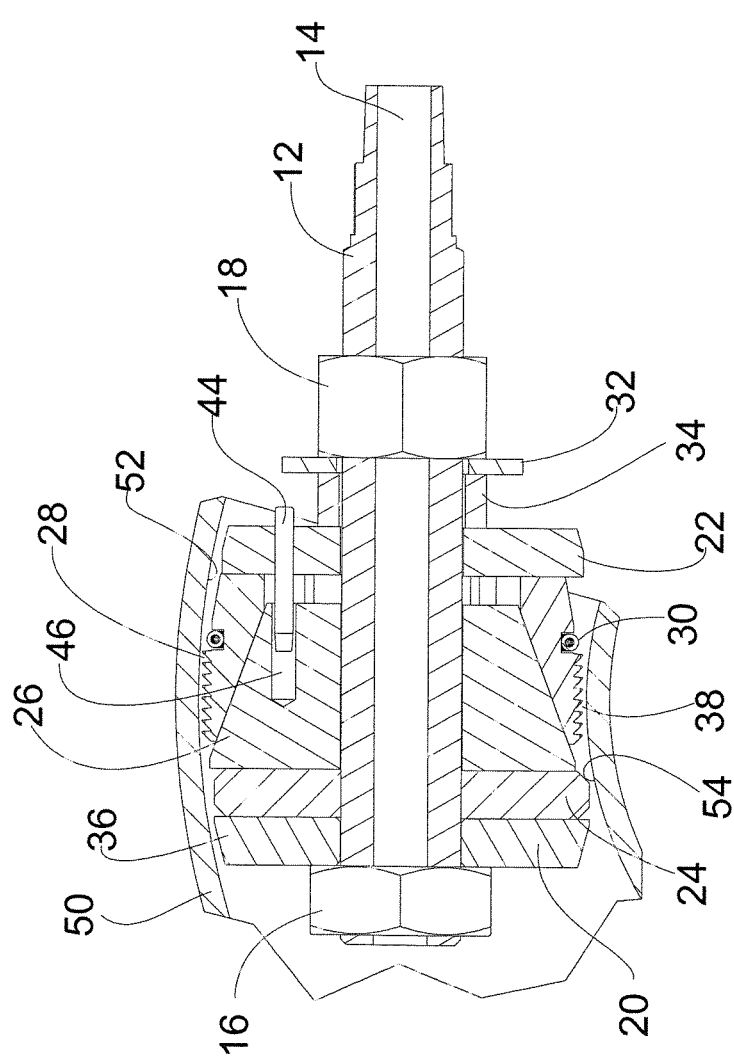
FIG. 5 is a cross-sectional view of the test plug of FIG. 1 in a condition for insertion/removal from the elbow pipe of FIG. 3.
Figure 6:
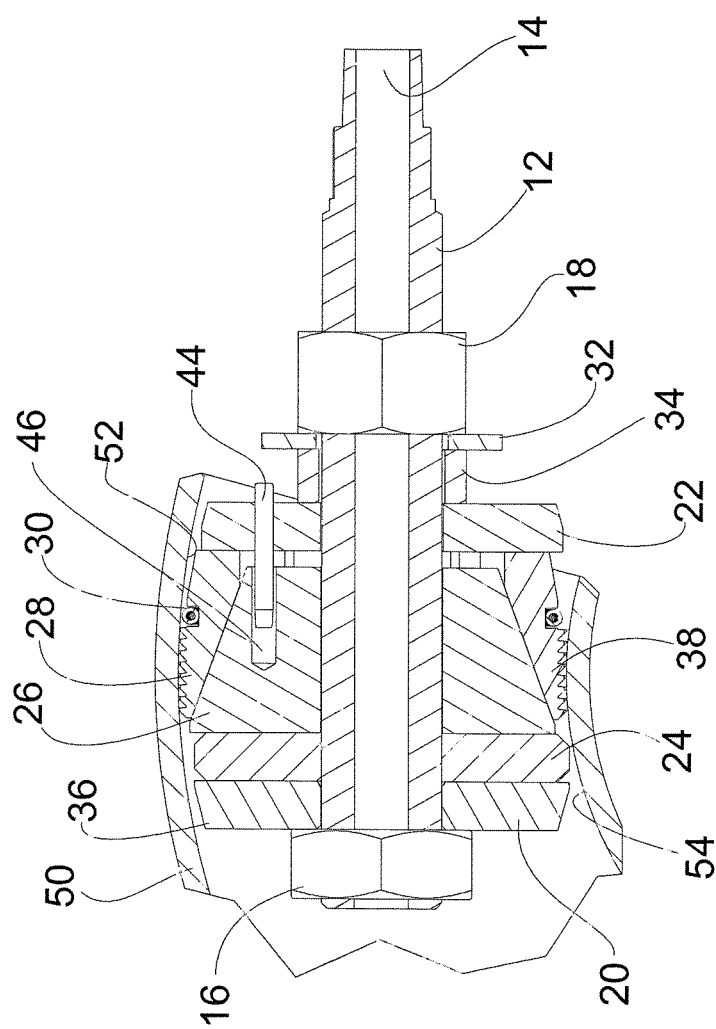
FIG. 6 is a cross-sectional view of the test plug and elbow pipe of FIG. 5 with the test plug placed in a condition in which the grippers of the test plug engage the inner diameter surface of the walls of the elbow pipe.
Figure 7:
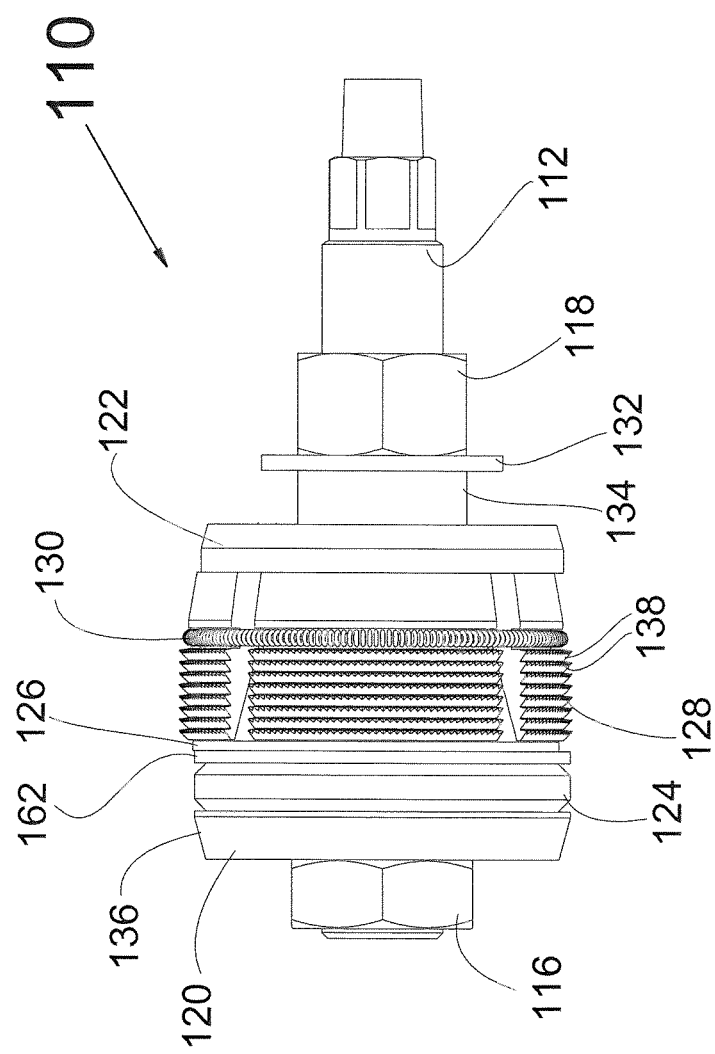
FIG. 7 is an elevational view of a second embodiment of a test plug.

In use, as best shown in FIGS. 3-6, the test plug 10 may be inserted into an elbow pipe 50. The elbow pipe 50 will inherently have a curved inner peripheral surface that includes surfaces that are concave and surfaces that are convex. For instance, the inner surfaces will include a most concave inner wall surface 52 and a most convex inner wall surface 54 as shown in FIGS. 5 and 6. The test plug 10 is located within the elbow pipe 50 such that the pin 44 is located adjacent the most concave inner wall surface 52 of the elbow pipe 50 and opposite the most convex inner wall surface 54 of the elbow pipe 50. See FIG. 5.

As the test plug 10 is tightened, the uniform set of grippers 28 advance up the cone-shaped sloped surface of the camming element 26 until they firmly engage the inner wall surfaces of the elbow pipe. See FIG. 6. In this condition, the test plug is tightly gripped to the curved walls of the elbow pipe. Further tightening of the test plug 10 causes the rear plate 20 to advance toward the rear of the camming element 26 to compress the sealing element 24 and cause it to expand into sealing engagement with the inner walls of the elbow pipe 50 and outer wall of the shaft 12. In this condition, the elbow pipe 50 is ready for testing.

Accordingly, the first embodiment provides a fixed eccentric alignment between the grippers (which are supported on the outer surface of the cone-shaped camming element) and the shaft. This is provided because the shaft does not extend centrally through the camming element; rather, there is a fixed offset B as discussed above. The fixed offset distance may be provided based on the specific pipe size being tested. Of course, when the test plug is tightened, the sealing element will be expanded into sealing engagement with the adjacent pipe walls and will be located downstream from the grippers in the curved pipe. Accordingly, the sealing element in a normal condition and as expanded will be aligned eccentrically relative to the grippers. Thus, there is an eccentric relationship between the grippers and the shaft and between the grippers and sealing element which enables the plug to properly grip and form a seal in a test pipe elbow.

Second Embodiment

Test Plug Having a Floating Cone

Figure 8:
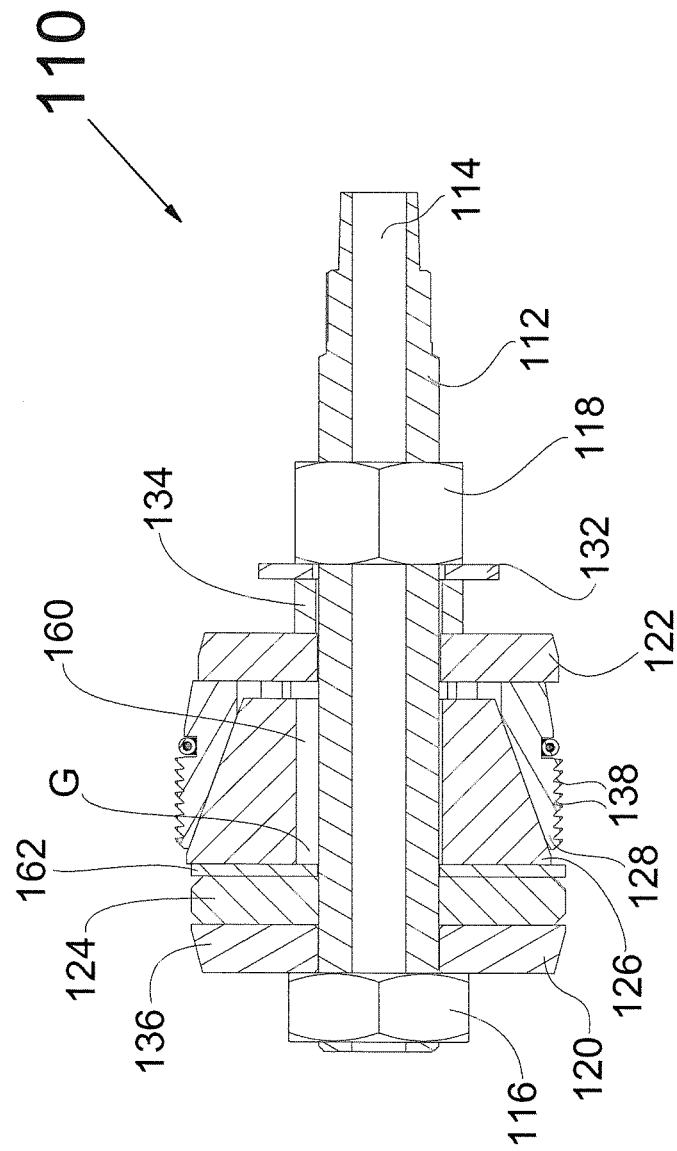
FIG. 8 is a cross-sectional view taken longitudinally of the test plug of FIG. 7 in which the shaft is shown off center relative to the cone-shaped camming element of the test plug.
Figure 9:
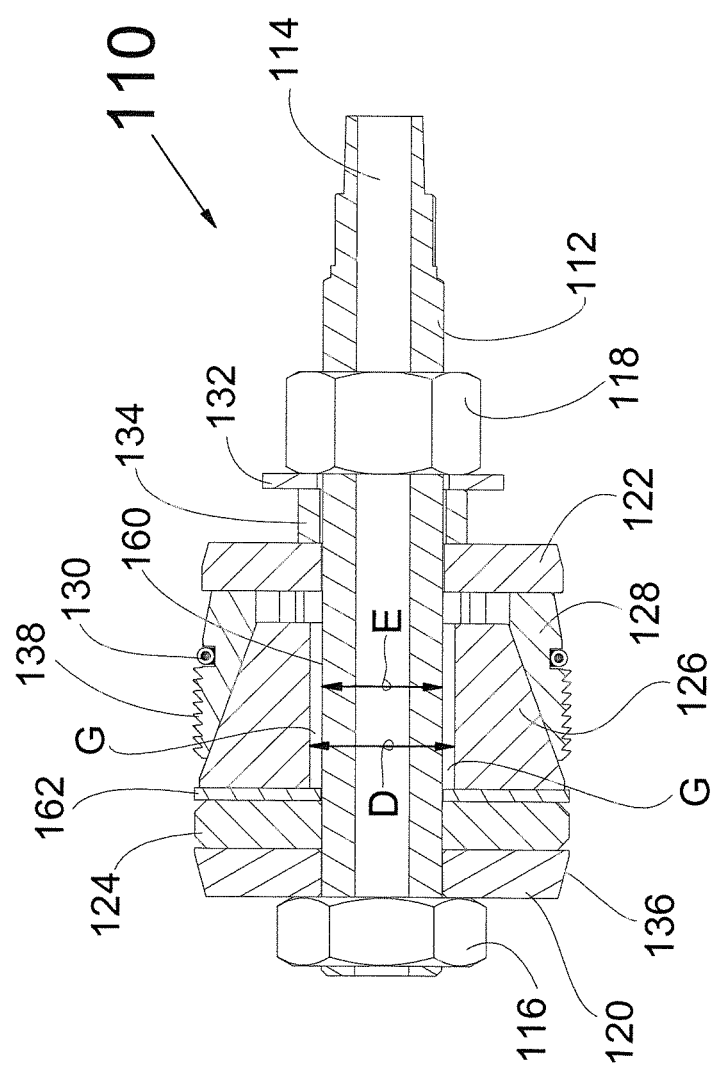
FIG. 9 is a cross-sectional view taken longitudinally of the test plug of FIG. 7 in which the shaft is shown centered relative to the cone-shaped camming element of the test plug.

In the second illustrated embodiment (see FIGS. 7-15), the hollow or open channel 160 of the camming element 126 of the test plug 110 extends centrally through the camming element 126 and has a diameter D greater than the outer diameter E of the shaft 112. See FIG. 11. Accordingly, the camming element 126 is not only able to slide lengthwise along the shaft 112, the camming element 126 is also provided with a predetermined amount of play in a direction radial toward and away from the shaft 112 (i.e., the camming element 126 is permitted to "float" relative to the shaft 112 and does not necessarily have to be in direct contact therewith). For example, the shaft 112 may contact one surface of the camming element 126 as shown in FIG. 8 in which an open gap G exists within the hollow channel 160 of the camming element 126. In contrast, the shaft 112 in FIG. 9 is located centrally within the hollow channel 160 of the camming element 126 and is therefore equally spaced from all surfaces of the camming element 126 defining the channel 160 and is not in direct contact with any of the surfaces of the camming element 126.

By way of example and not by way of limitation, the outer diameter D of the hollow channel 160 may be at least 3% greater than the outer diameter E of the shaft 112 or may be 5% to 30% greater than the outer diameter E. This difference in outer diameters provides a predetermined amount of free movement of the camming element relative to the shaft in a direction perpendicular to a longitudinal axis of the shaft and permits the test plug to automatically accommodate inner surface geometries of elbow pipes. As an alternative, the hollow channel 160 and/or the shaft 112 are not required to be cylindrical or have a diameter and may be other shapes, i.e., square, oval, hexagonal, or the like. However, the size of the hollow channel must be greater than that of the shaft to provide an open gap and permit relative floating movement as discussed above.

The test plug 110 additionally includes a seal washer 162 that extends between the rear of the camming element 126 and the elastomeric sealing element 124 and is able to slide relative to the shaft 212. The seal washer 162 supports the sealing element 124 as it is being compressed to form a seal and prevents any part of the sealing element 124 from extruding into any gap existing between the shaft 112 and camming element 126 within the hollow channel 160. For this purpose, the seal washer 162 is annular and its opening is closely matched to the outer diameter of the shaft 112 with little or no gap therebetween.

The significance of this floating cone embodiment is that, unlike with the eccentric cone disclosed relative to the first embodiment, the test operator is not required to orient or position the test plug 110 in any relation relative to pipe elbow geometry. Thus, both the camming element 126 and the set of grippers 128 of the test plug 110 float relative to the shaft 112 and are free to locate to a best alignment in a radial direction relative to the shaft 112 within an elbow pipe 150.

Figure 12:
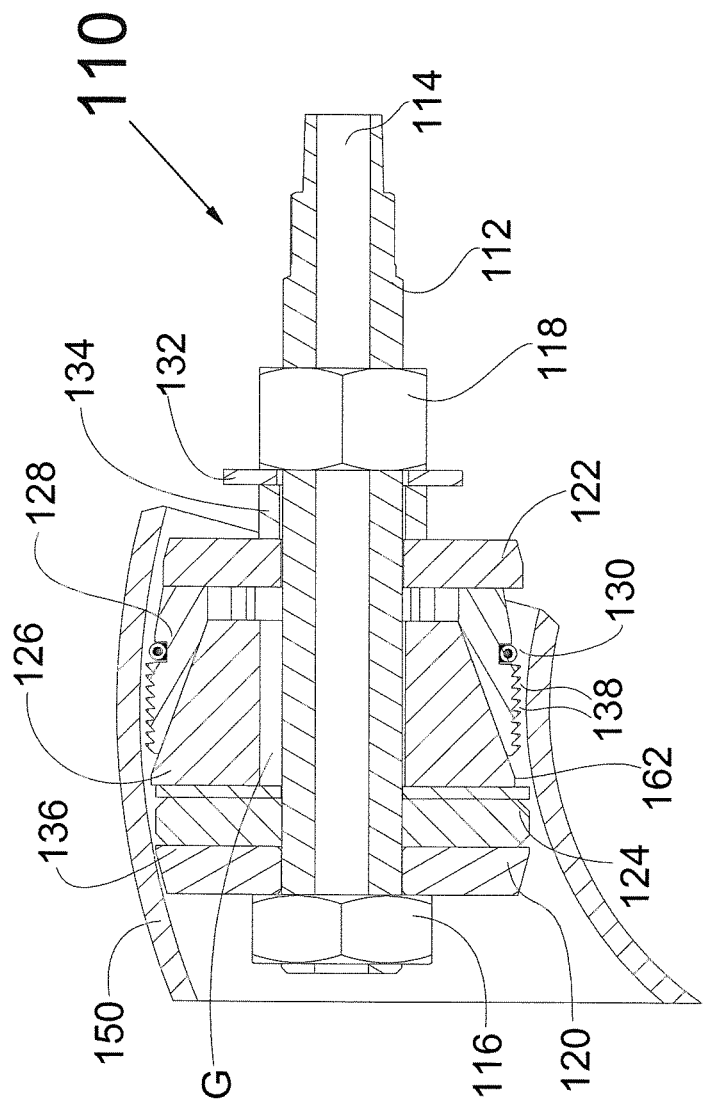
FIG. 12 is a cross-sectional view of the test plug of FIG. 7 in a condition for insertion/removal from the elbow pipe of FIG. 11.
Figure 13:
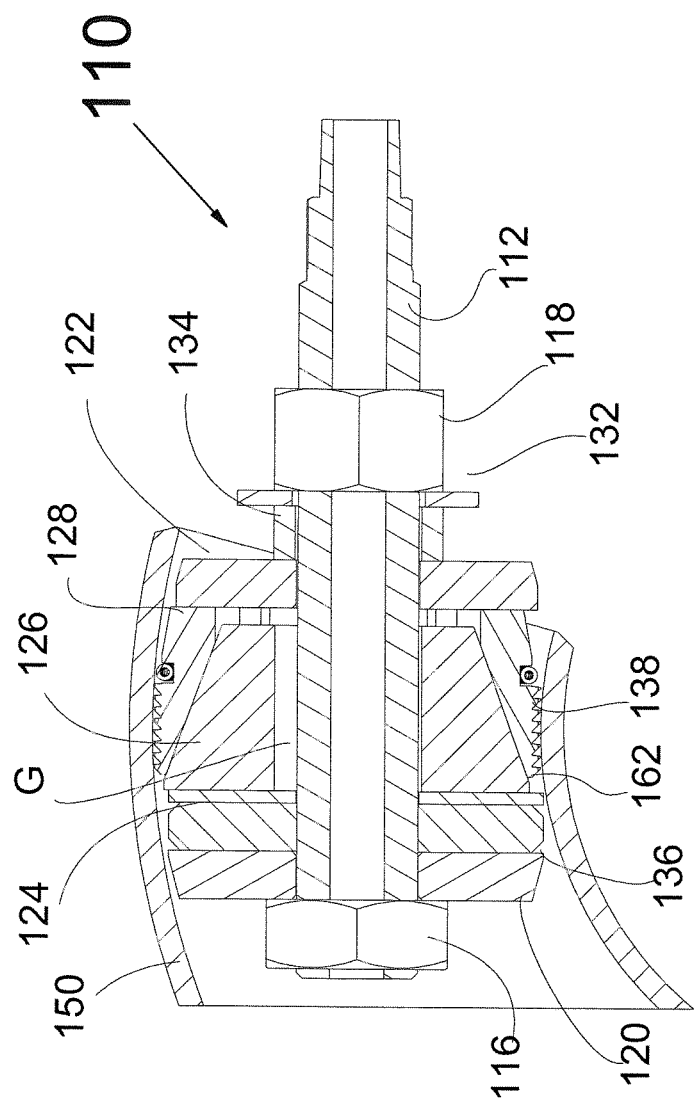
FIG. 13 is a cross-sectional view of the test plug and elbow pipe of FIG. 12 with the test plug placed in a condition in which the grippers of the test plug engage the inner diameter surface of the walls of the pipe.

For example, during installation of the test plug 110, an operator inserts the test plug 10 into an elbow pipe 150 as shown in FIG. 12 and then begins to tighten the test plug 110 by tightening/advancing the front nut 118 relative to the shaft 112 so that all segments of the set of grippers 128 firmly engage the inner wall surfaces of the elbow pipe 150. See FIG. 13. While the test plug 110 is being installed, the grippers 128 are automatically placed in best alignment with the inner pipe elbow curvature by the floating action of the camming element 126 relative to the shaft 112 thereby automatically finding the best possible position to uniformly engage and grip the pipe elbow inner surface. Thus, regardless of test plug position and orientation relative to the concave and convex curved surfaces of the elbow pipe 150, the test plug 110 is able to automatically accommodate the pipe curvature and provide a strong and reliable grip and leak-resistant seal.

Figure 14:
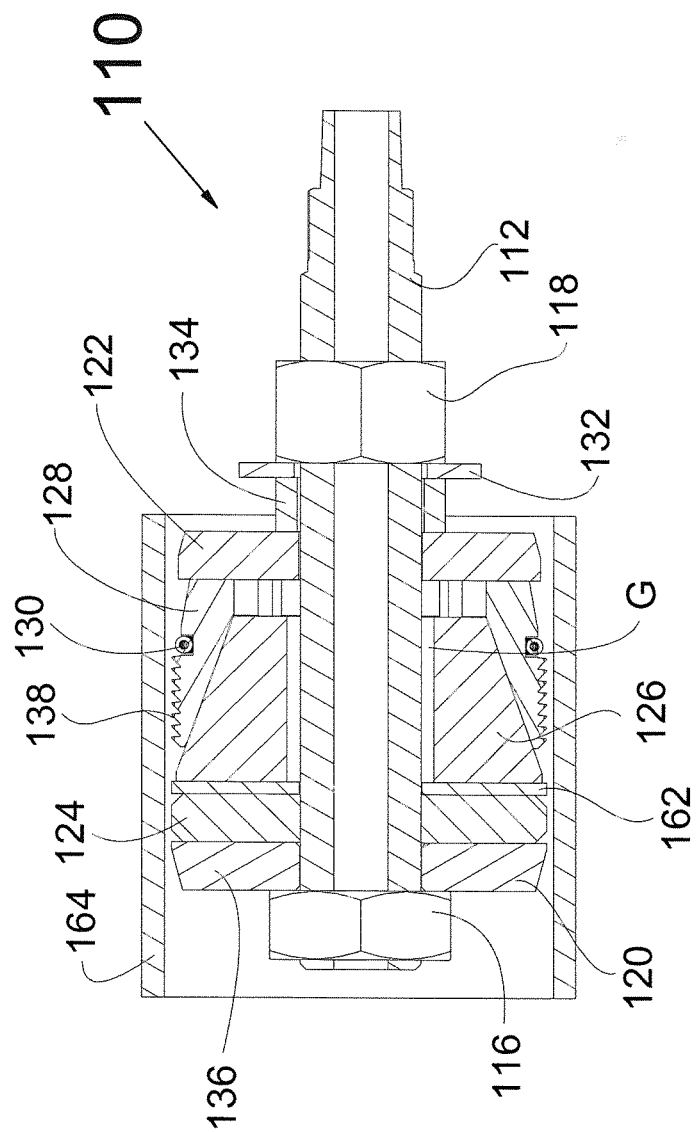
FIG. 14 is a cross-sectional view of the test plug of FIG. 7 that is positioned within a straight section of pipe and that is in a condition for insertion/removal.
Figure 15:
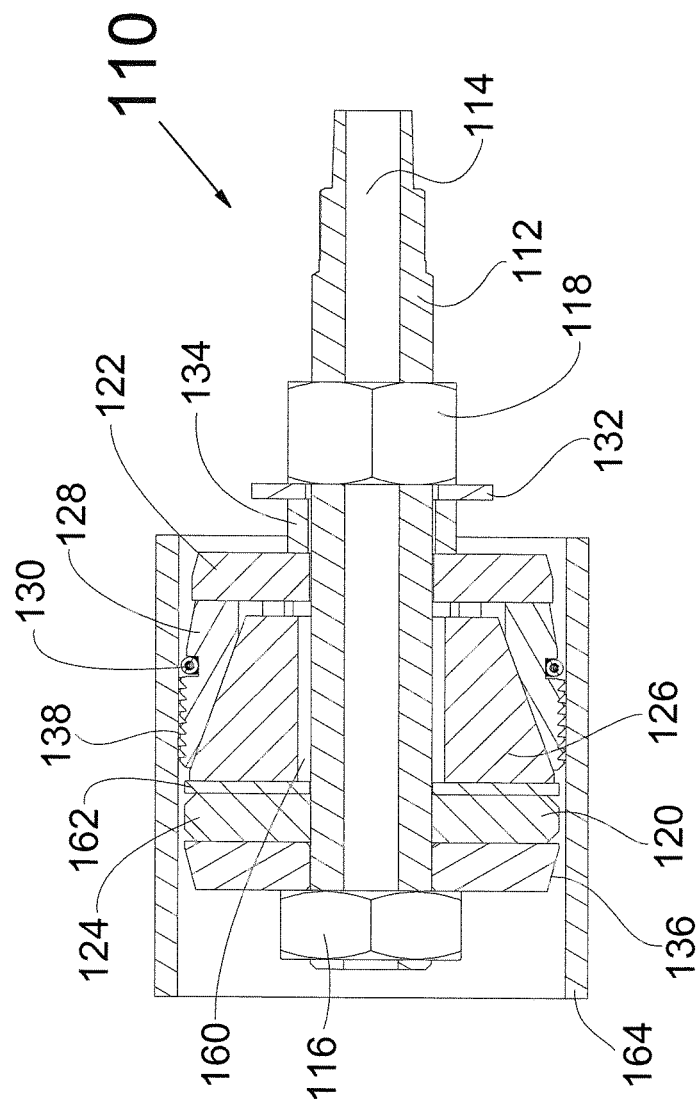
FIG. 15 is a cross-sectional view of the test plug and straight section of pipe of FIG. 14 with the test plug placed in a condition in which the grippers of the test plug engage the inner diameter surface of the walls of the pipe.
Figure 16:
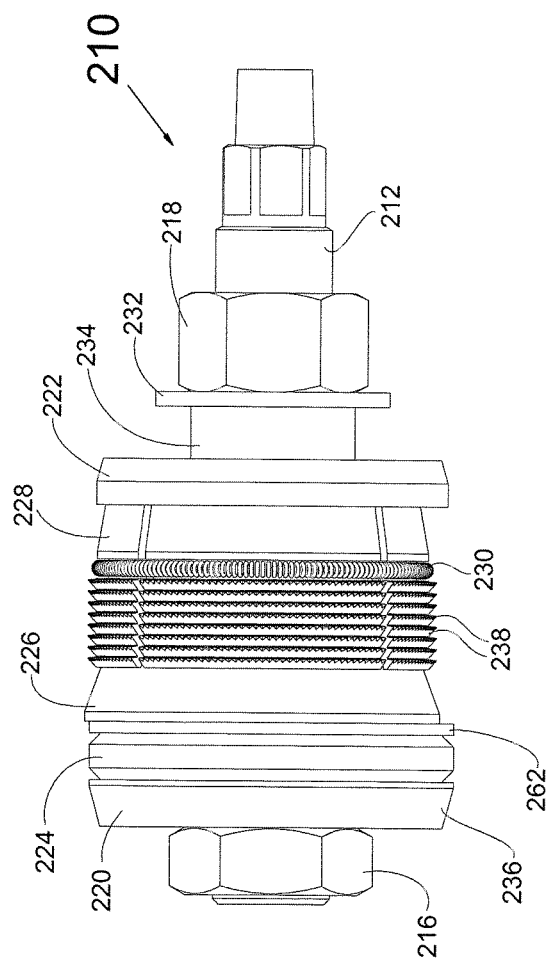
FIG. 16 is an elevational view of a third embodiment of a test plug.

In addition, as best shown in FIGS. 14 and 15, the test plug 110 may also be used in straight sections of pipe. For instance, FIG. 14 shows the test plug 110 inserted into the open end of a straight pipe section 164, and FIG. 15 shows the test plug 110 as tightened (i.e., in a compressed condition) in which the set of grippers 128 have been advanced into to firm gripping engagement with the inner surfaces of the straight pipe section 164. Of course, further tightening of the test plug 110 will cause the sealing element 124 of the test plug 110 to be compressed and expand into sealing engagement with the inner surface of the straight pipe 164. Here, the seal washer 162, discussed above, prevents any extrusion of the sealing element 124 into the gap between the camming element 126 and shaft 112. Also, as shown in FIGS. 14 and 15, the shaft 112 extends concentrically within the open channel 160 of the camming element 126 and cylindrical inner surface walls of the pipe 164.

Accordingly, the second embodiment provides self-adjusting alignment between the grippers (which are supported on the outer surface of the cone-shaped camming element) and the shaft. This is provided because the camming element is permitted to float relative to the shaft as discussed above. Thus, when the test plug is tightened within a test elbow pipe, the grippers are aligned in an eccentric relation relative to the shaft. The sealing element will also necessarily be in an eccentric relation to the grippers. Thus, the test plug permits an eccentric relationship to be formed between the grippers and the shaft and between the grippers and sealing element which enables the plug to properly grip and form a seal in a test pipe elbow.

Third Embodiment

Test Plug Having a Floating Cone with O-Ring

The test plug 210 of the third embodiment illustrated in FIGS. 16-24 is similar to the test plug 110 discussed above. For example, the test plug 210 includes a camming element 226 with a hollow channel 260 having a greater diameter than that of outer diameter of the shaft 212. Thus, the camming element 226 "floats" on the shaft 212 and automatically assumes a best position to grip and seal the inner surface geometry of an elbow pipe. In addition, the test plug 210 includes a seal washer 262 to prevent extrusion of the sealing element 224 in any gap inherently existing between the camming element 226 and shaft 212 within the channel 260 of the camming element 226.

Figure 17:
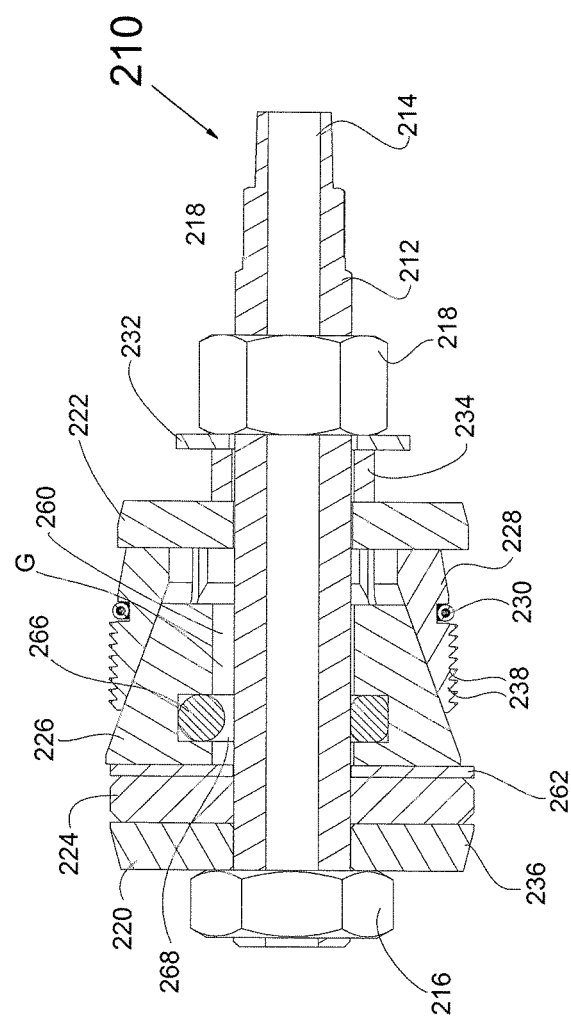
FIG. 17 is a cross-sectional view taken longitudinally of the test plug of FIG. 16 in which the shaft is shown off center relative to the cone-shaped camming element of the test plug.
Figure 18:
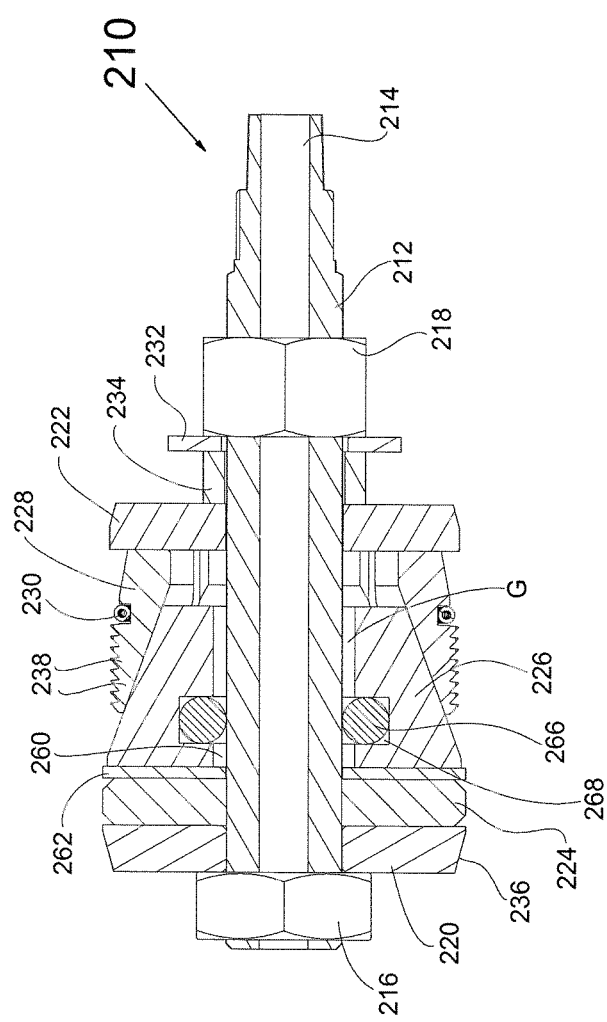
FIG. 18 is a cross-sectional view taken longitudinally of the test plug of FIG. 16 in which the shaft is shown centered relative to the cone-shaped camming element of the test plug.
Figure 19:
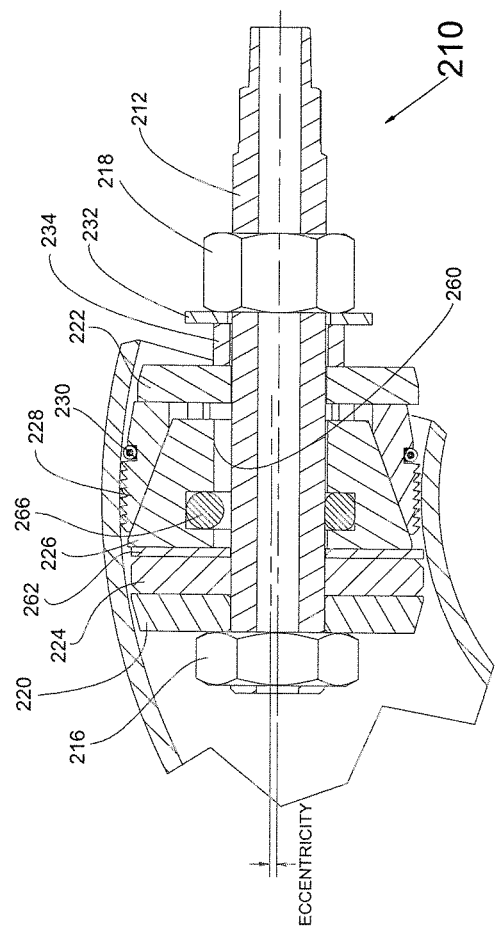
FIG. 19 is a cross-sectional view of the test plug of FIG. 16 positioned within an elbow pipe.
Figure 20:
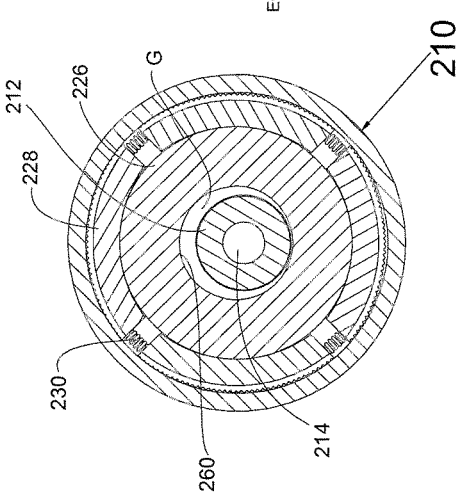
FIG. 20 is a transverse cross-sectional view of the test plug and elbow pipe of FIG. 19.
Figure 21:
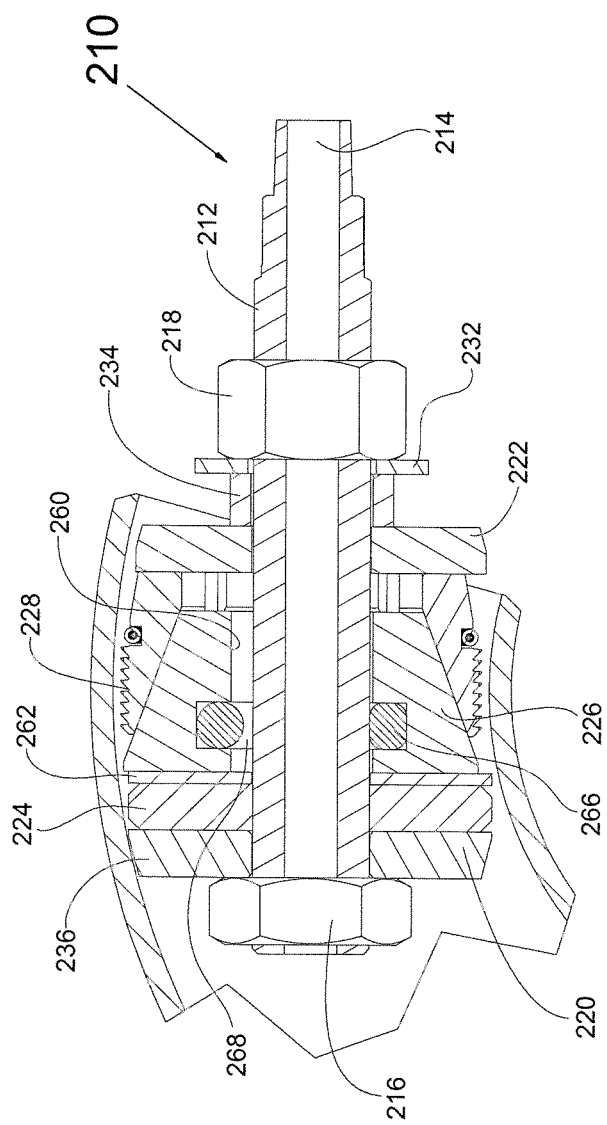
FIG. 21 is a cross-sectional view of the test plug of FIG. 16 in condition for insertion/removal from the elbow pipe of FIG. 20.
Figure 22:
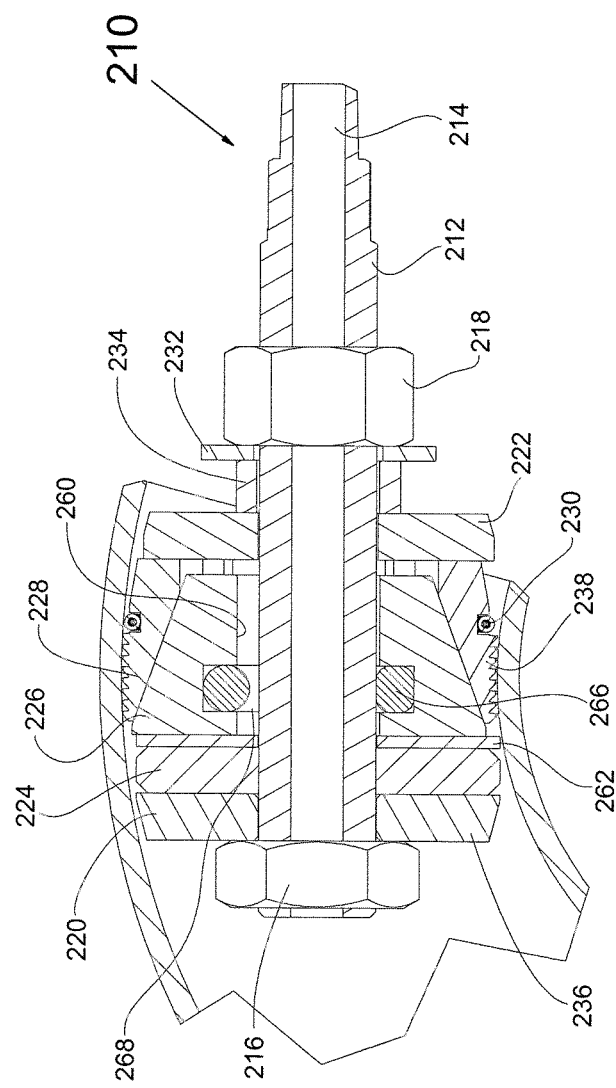
FIG. 22 is a cross-sectional view of the test plug and elbow pipe of FIG. 21 with the test plug placed in a condition in which the grippers of the test plug engage the inner diameter surface of the walls of the pipe.
Figure 23:
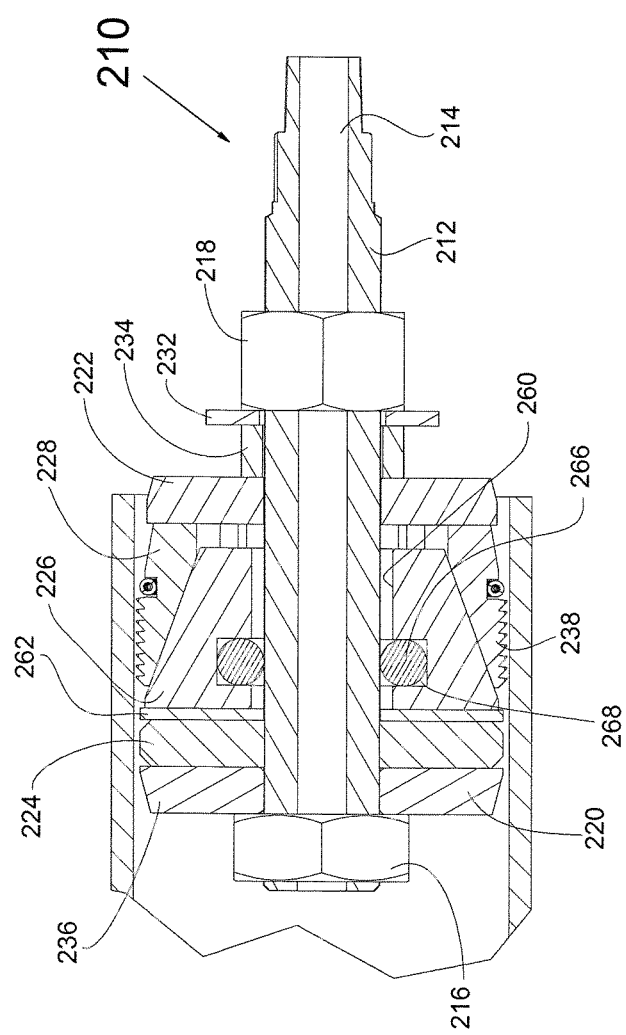
FIG. 23 is a cross-sectional view of the test plug of FIG. 16 that is positioned within a straight section of pipe and that is in condition for insertion/removal.
Figure 24:
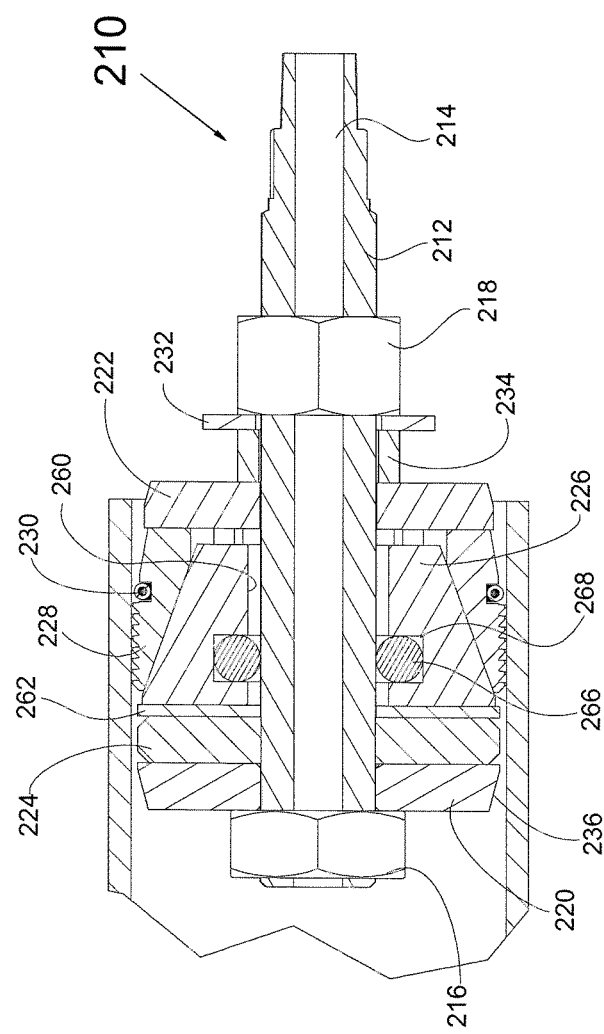
FIG. 24 is a cross-sectional view of the test plug and straight section of pipe of FIG. 21 with the test plug placed in a condition in which the grippers of the test plug engage the inner diameter surface of the walls of the pipe.

In addition to the above referenced components, test plug 210 also includes an O-ring 266 or like resilient spacing component. The O-ring 266 may be seated within a groove or circumferential cavity 268 extending in the wall of the camming element 226 defining the channel 260. As best shown in FIG. 18, the O-ring 266 functions to automatically center the shaft 212 relative to the walls of the camming element 226 defining the channel 260. The O-ring 266 may be made of a resilient material, such as an elastomeric material, and may be resiliently compressible when a predetermined amount of pressure is applied. For instance, as shown in FIG. 17, the O-ring 266 is compressed to permit the shaft 212 to extend through the channel 260 such that it is not in a position concentric with the walls forming the channel 260.

Accordingly, unlike the test plug 110 in which the camming element 126 is carried loosely on the shaft 112, the test plug 210 includes an O-ring 266 that provides a dampening and cushioning flexible support for the camming element 226 relative to the shaft 212. Thus, the test plug 210 provides a camming element that both floats and self-aligns relative to the shaft. The significance is that when the test plug 210 is applied within a straight segment of pipe, the shaft 212 automatically assumes a desired concentric position within the open channel 260 of the test plug 210 and inner walls of the pipe. For example, see FIGS. 23 and 24 and the straight pipes in which the shaft 212 is centered by the O-ring 266 and see FIGS. 21 and 22 in which the shaft 212 is offset within the open channel 260 and compresses the O-ring 266 so that the test plug 210 can best accommodate and align with the curved walls of an elbow pipe.

Accordingly, the third embodiment provides self-adjusting alignment between the grippers (which are supported on the outer surface of the cone-shaped camming element) and the shaft. This is provided because the camming element is permitted to float relative to the shaft as discussed above. Thus, when the test plug is tightened within a test elbow pipe, the grippers automatically self-align in an eccentric relation relative to the shaft. The sealing element will also necessarily be in an eccentric relation to the grippers. Thus, the test plug permits an eccentric relationship to be formed between the grippers and the shaft and between the grippers and sealing element which enables the plug to properly grip and form a seal in a test pipe elbow.

The test plug 210 performs exceptionally well in various sizes and materials (i.e., metallic, polymer, carbon steel, alloy steel, stainless steel, high alloys, GRE, PVC, FRP, and the like) of pipe elbows (i.e., 90°, 45°, long and short radius) and pipe fittings (tees, wyes, crosses, reduces, etc.). The test plug 210 does not require special adjustment during installation, testing or removal, and the set of grippers, sealing element, truncated cone-shaped camming element, and other plug components did not show any unusual wear or damage during tests.

The foregoing description and specific embodiments are merely illustrative of the principles thereof, and various modifications and additions may be made to the apparatus by those skilled in the art, without departing from the spirit and scope of this invention.

The invention claimed is:

1. A test plug for insertion into and plugging of an open end of an elbow pipe during a pipe testing procedure, comprising a shaft on which an annular elastomeric sealing element, a camming element, and a set of grippers are carried between front and rear plates, said camming element and set of grippers being carried on said shaft such that a predetermined amount of free floating movement of said camming element relative to said shaft in a direction generally perpendicular to a longitudinal axis of said shaft is permitted, whereby relative movement of said front plate toward said rear plate forces said set of gripper elements to advance outward on a sloped surface of the camming element to a gripping position relative to an inner diameter wall of an elbow pipe and compression of said sealing element into a fluid-tight sealing position with the inner diameter wall of the elbow pipe such that said set of gripper segments are positioned in eccentric relation to said sealing element and said shaft.

2. A test plug according to claim 1, wherein a hollow channel extends through said camming element and said shaft extends through the hollow channel, and wherein said hollow channel is of a size to receive said shaft and maintain an open gap between said shaft and said camming element to permit said free-floating movement.

3. A test plug according to claim 2, wherein said hollow channel is of a first predetermined diameter and a section of said shaft on which said camming element is carried is of a second predetermined diameter, and wherein said first predetermined diameter is greater than said second predetermined diameter.

4. A test plug according to claim 2, further comprising a resilient compressible ring of elastomeric material extending within said hollow channel between said camming element and said shaft such that said ring normally positions said shaft concentrically within said hollow channel.

5. A test plug according to claim 1, wherein said set of gripper segments extend circumferentially about said camming element and include multiple identical segments.

6. A test plug according to claim 1, wherein each gripper segment of said set of gripper segments has a plurality of circumferentially-extending rows of teeth and each row is serrated to provide a series of pointed teeth separated by gaps in each row of each segment.

7. A test plug for insertion into and plugging of an open end of an elbow pipe, comprising:
a shaft,
a resilient sealing element carried on said shaft,
a set of gripper segments carried on said shaft, said set of gripper segments being movable relative to said shaft between pipe-gripping and pipe-non-gripping positions such that, when said test plug is placed in sealing and gripping engagement relative to an inner diameter wall of an elbow pipe, said set of gripper segments are eccentrically aligned to said sealing element, and
a camming element carried on said shaft and having an outer camming surface on which said set of gripper segments are seated and movable between said pipe-gripping and pipe-non-gripping positions, wherein said camming element defines a hollow channel extending lengthwise therethrough, wherein said shaft extends through said hollow channel of said camming element, and wherein said hollow channel is of a size greater than an outer periphery of said shaft such that an open gap exists between said camming element and said shaft permitting a predetermined amount of floating movement of said camming element relative to said shaft in a direction generally perpendicular to a longitudinal axis of said shaft.

8. A test plug according to claim 7, wherein, when said test plug is placed in sealing and gripping engagement relative to an inner diameter wall of an elbow pipe, said set of gripper segments are positioned in eccentric relation to said shaft.

9. A test plug according to claim 7, wherein said hollow channel is of a first predetermined diameter and a section of said shaft on which said camming element is supported is of a second predetermined diameter, and wherein said first pre-determined diameter is greater than said second predetermined diameter to permit formation of said open gap therebetween.

10. A test plug according to claim 7, further comprising a resilient compressible material extending within said hollow channel between said camming element and said shaft such that said resilient compressible material normally positions said shaft concentrically within said hollow channel.

11. A test plug according to claim 7, wherein said camming element is in the form of a truncated cone with said outer camming surface being a sloped surface such that, when the set of gripping segments are forced to slide along said sloped surface, the gripping segments advance up the sloped surface.

12. A test plug according to claim 7, wherein said set of gripper segments extend circumferentially about said camming element and include multiple identical segments.

13. A test plug according to claim 12, wherein each gripper segment has a plurality of circumferentially-extending rows of teeth and each row is serrated to provide a series of pointed teeth separated by gaps in each row of each segment.

14. A test plug according to claim 7, further comprising front and rear washers carried on said shaft such that said camming element, said set of gripper segments, and said resilient sealing element are located therebetween and such that relative movement of said front and rear washers toward each other causes said set of gripper elements to advance along the camming surface to the pipe-gripping position relative to an inner diameter wall of an elbow pipe and compression of said sealing element into a fluid-tight sealing position with the inner diameter wall of the elbow pipe.

15. An assembly including the test plug according to claim 7 and an elbow pipe, wherein said elbow pipe has an open end and an inner diameter wall, wherein said test plug extends within said elbow pipe adjacent said open end, wherein said sealing element carried on said shaft of said test plug is placed in sealing engagement with said inner diameter wall of said elbow pipe, and wherein said set of gripper segments firmly engages and grips said inner diameter wall of said elbow pipe such that said set of gripper segments are in eccentric relation to said sealing element.

* * * * *